(12) United States Patent
Kimura

(10) Patent No.: US 6,760,510 B2
(45) Date of Patent: Jul. 6, 2004

(54) WAVELENGTH MULTIPLEX OPTICAL COMMUNICATION MODULE

(75) Inventor: Naoki Kimura, Tokyo (JP)

(73) Assignee: NEC Corporation, Tokyo (JP)

(*) Notice: Subject to any disclaimer, the term of this patent is extended or adjusted under 35 U.S.C. 154(b) by 347 days.

(21) Appl. No.: 10/052,346

(22) Filed: Jan. 23, 2002

(65) Prior Publication Data
US 2002/0071633 A1 Jun. 13, 2002

(30) Foreign Application Priority Data
Jan. 24, 2000 (JP) .......................... 2001-016376

(51) Int. Cl.$^7$ .................... G02B 6/293; H04J 14/02
(52) U.S. Cl. ................................ 385/24; 398/82
(58) Field of Search ..................... 385/24, 42, 46, 385/88, 92; 398/43, 82, 85

(56) References Cited

U.S. PATENT DOCUMENTS

| | | | |
|---|---|---|---|
| 5,064,263 A | * | 11/1991 | Stein ............................ 385/14 |
| 5,799,120 A | * | 8/1998 | Kurata et al. ................. 385/45 |
| 5,917,626 A | * | 6/1999 | Lee .............................. 398/88 |
| 6,125,221 A | * | 9/2000 | Bergmann et al. ........... 385/33 |
| 6,389,188 B1 | * | 5/2002 | Scobey et al. ................ 385/18 |

FOREIGN PATENT DOCUMENTS

JP          10-133069          5/1998

* cited by examiner

Primary Examiner—Frank G. Font
Assistant Examiner—Michael A. Lyons
(74) Attorney, Agent, or Firm—McGinn & Gibb, PLLC (57) ABSTRACT

A wavelength multiplex optical communication module is provided. This module consists of first to third optical waveguides on a substrate, the first waveguide coupled to the second waveguide, with a light emitting device disposed on the end of the first waveguide opposite the coupler. A wavelength filter is located at one end of the substrate in conjunction with ends of the second and third waveguide for passing a wavelength of light to a detector while reflecting a different wavelength to the third waveguide. By virtue of this construction, the communication module can realize various functions such as transmission or reception of signal light with a plurality of wavelengths. That is, light with a specific wavelength can be sent, or other specific light in the input light can be received or transferred to another site.

18 Claims, 9 Drawing Sheets

λ1, λ2, λ3: WAVELENGTH
71: WAVELENGTH MULTIPLEXING OPTICAL COMMUNICATION MODULE
72: OPTICAL WAVEGUIDE SUBSTRATE
73: LIGHT EMITTING DEVICE
74: 1ST OPTICAL WAVEGUIDE
75, 76: END FACE
78: 1ST PORT
79: 2ND PORT
81: 1ST OPTICAL FIBER
82: 2ND OPTICAL FIBER
83: 2ND OPTICAL WAVEGUIDE
84: DIRECTIONAL COUPLER
85: 3RD OPTICAL WAVEGUIDE
86: WAVELENGTH FILTER
87: CARRIER
88: PHOTODETECTOR FOR RECEPTION

FIG. 1 PRIOR ART

- 11: WAVELENGTH MULTIPLEXING OPTICAL COMMUNICATION MODULE
- 12: SILICON SUBSTRATE
- 13: UPPER SURFACE
- 14: OPTICAL WAVEGUIDE
- 15: OPTICAL CIRCUIT PORT
- 16: I/O PORT OPTICAL FIBER
- 17: OPTICAL FIBER
- 18: PHOTODIODE (PD) MODULE
- 19: LASER DIODE MODULE
- 21, 22: CORE
- 25: OPTICAL OUTPUT PORT

FIG. 2 PRIOR ART

- $\lambda_1, \lambda_2$: WAVELENGTH
- 11: WAVELENGTH MULTIPLEXING OPTICAL COMMUNICATION MODULE
- 12: SILICON SUBSTRATE
- 14: OPTICAL WAVEGUIDE
- 15: OPTICAL CIRCUIT PORT
- 16: I/O PORT OPTICAL FIBER
- 17: OPTICAL FIBER
- 18: PHOTODETECTOR
- 19: LASER DIODE (LD) MODULE
- 21, 22: CORE
- 24: MULTIPLEXING/DEMULTIPLEXING SECTION IN OPTICAL CIRCUIT
- 25: OPTICAL OUTPUT PORT
- 26: BRANCHING SECTION
- 27, 28: PORT

FIG. 3 PRIOR ART

- λ1, λ2: WAVELENGTH
- 31: WAVELENGTH MULTIPLEXING OPTICAL COMMUNICATION MODULE
- 32: SINGLE MODE OPTICAL FIBER FOR INPUT
- 33: OPTICAL FIBER FOR OUTPUT
- 34: GLASS BLOCK
- 35: OPTICAL WAVEGUIDE
- 36, 37: I/O PORT
- 38: GROOVE
- 39: DIELECTRIC MULTI-LAYER FILM
- 41: BRANCHING SECTION
- 42: LASER DIODE MODULE
- 43: PHOTO DIODE MODULE
- 45: REFERENCE PLANE OF PLANAR OPTICAL WAVEGUIDE CIRCUIT

FIG. 4 PRIOR ART

- λ1, λ2: WAVELENGTH
- 51: WAVELENGTH MULTIPLEXING OPTICAL COMMUNICATION MODULE
- 52: OPTICAL WAVEGUIDE SUBSTRATE
- 53: 1ST OPTICAL FIBER
- 54: 2ND OPTICAL FIBER
- 55: 1ST PORT
- 56: 1ST OPTICAL WAVEGUIDE
- 57: 2ND PORT
- 58: WAVELENGTH DEMULTIPLEXING ELEMENT
- 59: 2ND OPTICAL WAVEGUIDE
- 61: 3RD PORT
- 63: LASER DIODE MODULE
- 64: 4TH PORT
- 65: 3RD OPTICAL WAVEGUIDE
- 66: PHOTODETECTOR FOR OPTICAL OUTPUT MONITOR

FIG. 5

- λ1, λ2, λ3: WAVELENGTH
- 71: WAVELENGTH MULTIPLEXING OPTICAL COMMUNICATION MODULE
- 72: OPTICAL WAVEGUIDE SUBSTRATE
- 73: LIGHT EMITTING DEVICE
- 74: 1ST OPTICAL WAVEGUIDE
- 75, 76: END FACE
- 78: 1ST PORT
- 79: 2ND PORT
- 81: 1ST OPTICAL FIBER
- 82: 2ND OPTICAL FIBER
- 83: 2ND OPTICAL WAVEGUIDE
- 84: DIRECTIONAL COUPLER
- 85: 3RD OPTICAL WAVEGUIDE
- 86: WAVELENGTH FILTER
- 87: CARRIER
- 88: PHOTODETECTOR FOR RECEPTION

FIG. 6

- 86: WAVELENGTH FILTER
- 86A: GLASS SUBSTRATE
- 86B, 86C: DIELECTRIC MULTI-LAYER FILM

FIG. 7

- 58: WAVELENGTH DEMULTIPLEXING ELEMENT
- 58A: HALF MIRROR
- 58B: DIELECTRIC MULTI-LAYER FILM

FIG. 8

λ2, λ3 : WAVELENGTH
θ : ANGLE
83 : 2ND OPTICAL WAVEGUIDE
85 : 3RD OPTICAL WAVEGUIDE
86 : WAVELENGTH FILTER
89 : IDENTICAL POINT
90 : LINE

FIG. 9

λ1, λ2, λ3 : WAVELENGTH
72 : OPTICAL WAVEGUIDE SUBSTRATE
73 : LIGHT EMITTING DEVICE
74 : 1ST OPTICAL WAVEGUIDE
75, 76 : END FACE
78 : 1ST PORT
79 : 2ND PORT
81 : 1ST OPTICAL FIBER
82 : 2ND OPTICAL FIBER
83 : 2ND OPTICAL WAVEGUIDE
84 : DIRECTIONAL COUPLER
85 : 3RD OPTICAL WAVEGUIDE
86 : WAVELENGTH FILTER
87 : CARRIER
88 : PHOTODETECTOR FOR RECEPTION
91 : WAVELENGTH MULTIPLEXING OPTICAL COMMUNICATION MODULE

FIG. 10

λ1, λ2, λ3: WAVELENGTH
72: OPTICAL WAVEGUIDE SUBSTRATE
74: 1ST OPTICAL WAVEGUIDE
75, 76: END FACE
78: 1ST PORT
79: 2ND PORT
81: 1ST OPTICAL FIBER
82: 2ND OPTICAL FIBER
83: 2ND OPTICAL WAVEGUIDE

84: DIRECTIONAL COUPLER
85: 3RD OPTICAL WAVEGUIDE
86: WAVELENGTH FILTER
87: CARRIER
88: PHOTODETECTOR FOR RECEPTION
101: WAVELENGTH MULTIPLEXING OPTICAL COMMUNICATION MODULE
102: PHOTODETECTOR

FIG. 11

λ1, λ2: WAVELENGTH
72: OPTICAL WAVEGUIDE SUBSTRATE
73: LIGHT EMITTING DEVICE
74: 1ST OPTICAL WAVEGUIDE
75, 76: END FACE
78: 1ST PORT
79: 2ND PORT
81: 1ST OPTICAL FIBER
82: 2ND OPTICAL FIBER

83: 2ND OPTICAL WAVEGUIDE
84A: DIRECTIONAL COUPLER
85: 3RD OPTICAL WAVEGUIDE
86a: WAVELENGTH FILTER
87: CARRIER
88: PHOTODETECTOR FOR RECEPTION
111: WAVELENGTH MULTIPLEXING OPTICAL COMMUNICATION MODULE

FIG. 12

- λ1, λ2, λ3: WAVELENGTH
- 72: OPTICAL WAVEGUIDE SUBSTRATE
- 73: LIGHT EMITTING DEVICE
- 74: 1ST OPTICAL WAVEGUIDE
- 75, 76: END FACE
- 78: 1ST PORT
- 79: 2ND PORT
- 81: 1ST OPTICAL FIBER
- 82: 2ND OPTICAL FIBER
- 83: 2ND OPTICAL WAVEGUIDE
- 84: DIRECTIONAL COUPLER
- 85: 3RD OPTICAL WAVEGUIDE
- 86: WAVELENGTH FILTER
- 87: CARRIER
- 88: PHOTODETECTOR FOR RECEPTION
- 121: WAVELENGTH MULTIPLEXING OPTICAL COMMUNICATION MODULE
- 122: PHOTODETECTOR FOR MONITORING

FIG. 13

λ1, λ2, λ3 = WAVELENGTH
72: OPTICAL WAVEGUIDE SUBSTRATE
73: LIGHT EMITTING DEVICE
74: 1ST OPTICAL WAVEGUIDE
75, 76: END FACE
78: 1ST PORT
79: 2ND PORT
81: 1ST OPTICAL FIBER
82: 2ND OPTICAL FIBER

83: 2ND OPTICAL WAVEGUIDE
84: DIRECTIONAL COUPLER
85: 3RD OPTICAL WAVEGUIDE
86b: WAVELENGTH FILTER
87A: CARRIER
88: PHOTODETECTOR FOR RECEPTION
122: PHOTODETECTOR FOR MONITORING
131: WAVELENGTH MULTIPLEXING OPTICAL
      COMMUNICATION MODULE

FIG. 14

λ1, λ2, λ3: WAVELENGTH
72: OPTICAL WAVEGUIDE SUBSTRATE
73: LIGHT EMITTING DEVICE
74: 1ST OPTICAL WAVEGUIDE
75, 76: END FACE
78: 1ST PORT
81: 1ST OPTICAL FIBER
83: 2ND OPTICAL WAVEGUIDE

84: DIRECTIONAL COUPLER
85: 3RD OPTICAL WAVEGUIDE
86: WAVELENGTH FILTER
87: CARRIER
88: PHOTODETECTOR POR RECEPTION
102: PHOTODETECTOR
141: WAVELENGTH MULTIPLEXING OPTICAL COMMUNICATION MODULE

US 6,760,510 B2

WAVELENGTH MULTIPLEX OPTICAL COMMUNICATION MODULE

FIELD OF THE INVENTION

The invention relates to a wavelength multiplex optical communication module for use in various communication networks, and more particularly to a wavelength multiplex optical communication module for use in multiplexing/demultiplexing or transmission/reception of light with different wavelengths.

BACKGROUND OF THE INVENTION

Various wavelength multiplex optical communication modules for use in multiplexing/demultiplexing or transmission/reception of light with different wavelengths have been developed.

Figure 1:
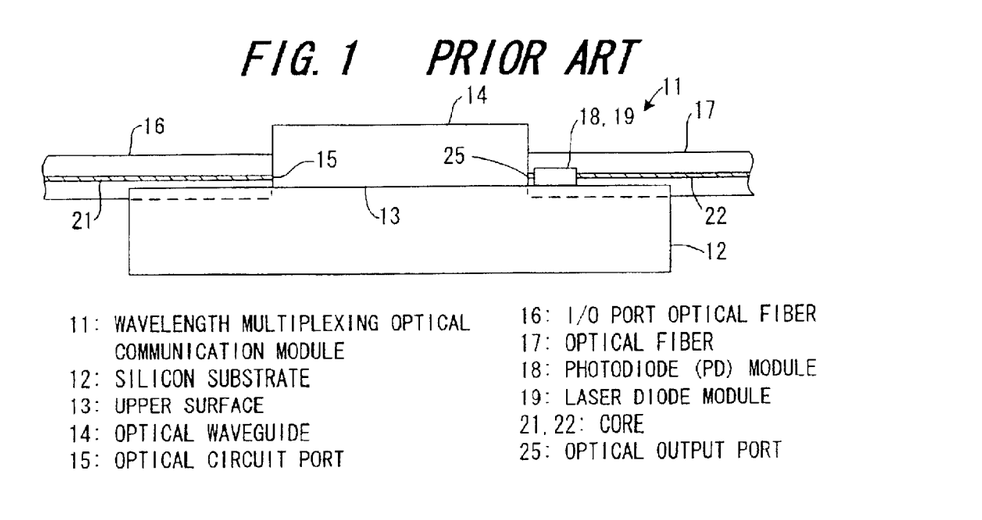
FIG. 1 is a side view of a conventional wavelength multiplex optical communication module.

FIG. 1 is a side view of a conventional wavelength multiplex optical communication module disclosed in Japanese Patent Laid-Open No. 133069/1998. This wavelength multiplex optical communication module 11 comprises a silicon substrate 12 and an optical waveguide 14 mounted on the silicon substrate 12 in its upper surface 13. An input/output (hereinafter often referred to as "I/O") port optical fiber 16 is provided on the left side of the optical waveguide 14 in the drawing so that one end of the I/O port optical fiber 16 is connected to a port 15 in the optical circuit. An optical fiber 17, a photodiode (PD) module 18, and a laser diode module 19 are provided on the right side of the optical waveguide 14 in the drawing. In FIG. 1, the photodiode module 18 is hidden by the laser diode module 19. Numeral 21 designates a core of the I/O port optical fiber, numeral 22 a core of the optical fiber 17, and numeral 25 an I/O port.

Figure 2:
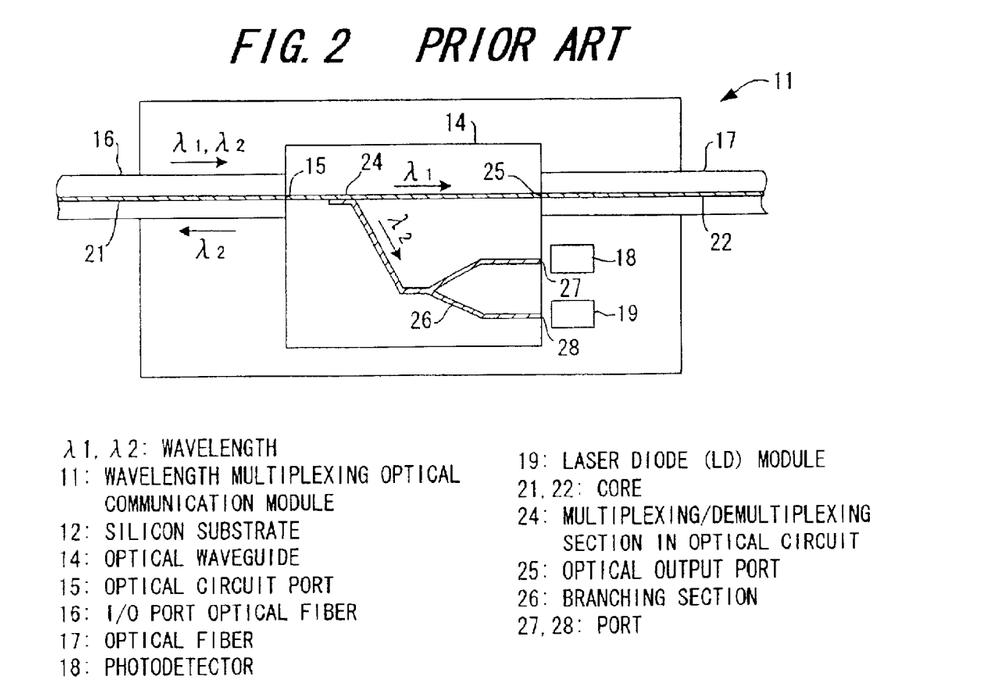
FIG. 2 is a top view of the wavelength multiplex optical communication module shown in FIG. 1.

FIG. 2 shows the upper surface of this conventional wavelength multiplex optical communication module. As shown in FIG. 2, the core 21 of the I/O port optical fiber 16 and the core 22 of the optical fiber 17 are provided on an extension line of an identical optical axis. Light with different wavelengths λ1 and λ2 is incident through the I/O port optical fiber 16 on the port 15. The incident light is demultiplxed in a multiplexing/demultiplexing section 24 in the optical circuit within the optical waveguide 14, and the demultiplexed light with wavelength λ1 as such travels straight and is sent to the optical output port 25. One end of the optical fiber 17 is optically coupled to the optical output port 25, and the light with wavelength λ1 is guided through the core 22 of the optical fiber 17.

On the other hand, the light with wavelength λ2 demultiplexed in the multiplexing/demultiplexing section 24 is branched in a branching section 26 into two parts which travel in two respective directions. One of the branched light parts reaches a port 27 and is input into a photodetector 18 where the optical signal is converted to an electrical signal. The other branched light part reaches a port 28. A laser diode (LD) module 19 is connected to the port 28. The laser diode module 19 is constructed so as to output the light with wavelength λ2. This light travels in the reverse direction through the branching section 26 and reaches the multiplexing/demultiplexing section 24 for multiplexing. The multiplexed light is input through the port 15 into the I/O port optical fiber 16 and is guided through the core 21 in the reverse direction.

The wavelength multiplex optical communication module 11 shown in FIGS. 1 and 2 has a structure such that the optical waveguide 14, the photodiode module 18 for receiving an optical signal, and the laser diode module 19 for sending an optical signal are mounted on the upper surface 13 of one silicon substrate 12. By virtue of this structure, the wavelength multiplex optical communication module 11 can be prepared at low cost.

In this wavelength multiplex optical communication module 11, two optical fibers 16, 17 are provided respectively on both sides of the optical waveguide 14 so as to sandwich the optical waveguide 14 therebetween. Therefore, in order to prevent the optical fibers 16, 17 from contacting with other electrical components (not shown), a certain space should be provided on both sides of the wavelength multiplex optical communication module 11. This disadvantageously makes it difficult to realize high density packaging of the wavelength multiplex optical communication module 11.

Japanese Patent No. 2919329 and Japanese Patent Laid-Open No. 333243/1993 also disclose wavelength multiplex optical communication modules. Also in these techniques, optical fibers are connected to an optical waveguide respectively in its end faces opposite to each other. Therefore, these techniques involve the same problem as the technique shown in FIGS. 1 and 2.

Figure 3:
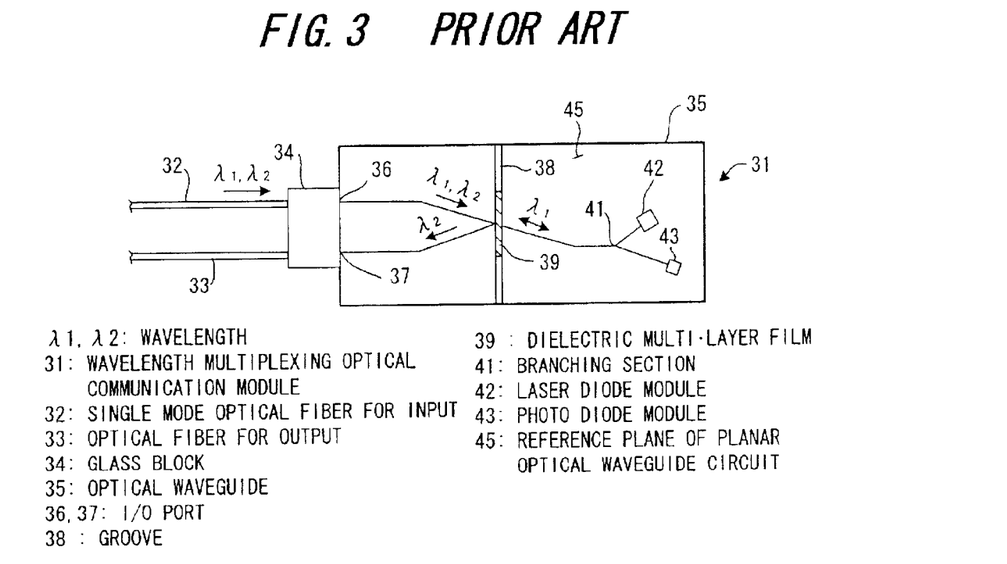
FIG. 3 is a plan view of another conventional wavelength multiplex optical communication module.

FIG. 3 shows a wavelength multiplex optical communication module which has been proposed in Japanese Patent Laid-Open No. 190026/1996 for solving the problem of packaging density of the above wavelength multiplex optical communication modules. In this conventional wavelength multiplex optical communication module 31, one end of an input single mode optical fiber 32 and one end of an output optical fiber 33 are coupled through a glass block 34 respectively to corresponding I/O ports 36, 37 of the optical waveguide 35. Light with different wavelengths λ1 and λ2 is incident through the input single mode optical fiber 32 on the I/O port 36. The light with wavelengths λ1 and λ2 is incident on a dielectric multi-layer film 39 disposed in a groove 38 formed in the center portion of the optical waveguide 35. Light with wavelength λ1 as such passes through the dielectric multi-layer film 39 and, in a branching section 41, is branched into two parts which travel through two respective paths. A laser diode module 42 is optically connected to the end of one of the paths, and a photodiode module 43 is optically connected to the end of the other path.

In this conventional wavelength multiplex optical communication module 31, the dielectric multi-layer film 39 is disposed perpendicularly to a reference plane 45 in a planar optical waveguide circuit to simplify the structure and thus to prepare a compact module. In the prior art technique shown in FIGS. 1 and 2, since two optical fibers 16, 17 are mounted respectively on different end faces of the optical waveguide, high density packaging of the wavelength multiplex optical communication module 11 cannot be realized. On the other hand, the wavelength multiplex optical communication module 31 shown in FIG. 3 solves this problem by connecting the optical fibers 32, 33 to an identical end face.

Figure 4:
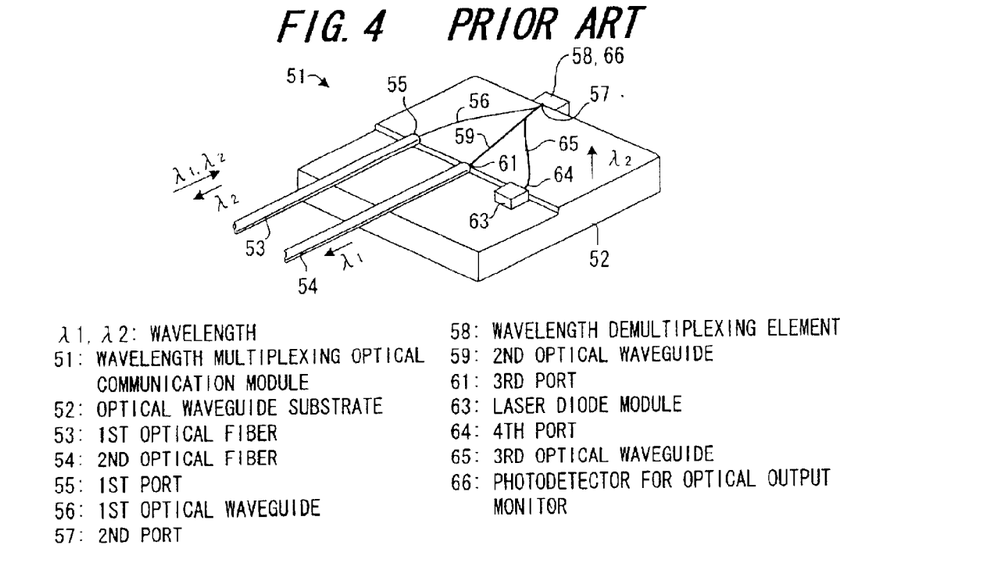
FIG. 4 is a perspective view of a further conventional wavelength multiplex optical communication module.

FIG. 4 shows a wavelength multiplex optical communication module disclosed in Japanese Patent Laid-Open No. 160952/1998 which is another example of the wavelength multiplex optical communication module wherein, as with the prior art technique shown in FIG. 3, two optical fibers are connected to one end face of an optical waveguide. In this wavelength multiplex optical communication module 51, a difference in level is provided in an optical waveguide substrate 52, and the end of a first optical fiber 53 and the end of a second optical fiber 54 are disposed in this portion of the difference in level. Light with different wavelengths λ1 and λ2 is incident through the first optical fiber 53 on a corresponding first port 55, is guided through a first optical waveguide 56, and is incident on a wavelength demultiplexing element 58 disposed on a second port 57 which is located opposite to the first port 55 of the optical waveguide substrate 52.

The wavelength demultiplexing element 58 substantially completely reflects light with wavelength $\lambda 1$. Therefore, the light with wavelength $\lambda 1$ is guided through a second optical waveguide 59, reaches a third port 61, and then is incident on the second optical fiber 54. Further, the wavelength demultiplexing element 58 permits a part of light with wavelength $\lambda 2$ to pass therethrough, and this light is received in a photodetector 66 for an optical output monitor provided behind the wavelength demultiplexing element 58. Light with wavelength $\lambda 2$, which has been reflected by the wavelength demultiplexing element 58, travels through the first optical waveguide 56 in the reverse direction and is incident on the first optical fiber 53. The light with wavelength $\lambda 2$ output from a laser diode module 63 disposed near the second optical fiber 54 is incident through a fourth port 64 on a third optical waveguide 65, is passed through the wavelength demultiplexing element 58, and is received in the photodetector 66 for an optical output monitor.

As described above, in the wavelength multiplex optical communication modules 31, 51 shown in FIGS. 3 and 4, since the two optical fibers 32, 33 or the two optical fibers 53, 54 are mounted on an identical end face, high density packaging can be realized. In the wavelength multiplex optical communication module 31 shown in FIG. 3, however, very troublesome work should be done for inserting a filter of the dielectric multi-layer film 39 (hereinafter referred to as "dielectric multi-layer film filter") into a narrow groove 38 provided in the optical waveguide 35. This disadvantageously makes it difficult to reduce the assembly cost of the module.

In the wavelength multiplex optical communication module 51 shown in FIG. 4, the wavelength demultiplexing element 58 responsible for complicate selection of transmission and reflection should be used, and, consequently, the production cost of the module is disadvantageously increased. Further, in this wavelength multiplex optical communication module 51, a dielectric multi-layer film for folding back light with a specific wavelength to the outside of the system should be provided on one side of a half mirror in its side on which light is incident. In this example, the dielectric multi-layer film used substantially completely reflects light with wavelength $\lambda 1$ while light with wavelength $\lambda 2$ is transmitted therethrough. In this case, the light with wavelength $\lambda 1$ is reflected from the dielectric multi-layer film, and the light with wavelength $\lambda 2$ is reflected from the half mirror. This causes a deviation in light folding-back position of the light with wavelength $\lambda 1$ and the light with wavelength $\lambda 2$. Disadvantageously, the deviation of the folding-back light from the waveguide increases the loss of light with wavelength $\lambda 2$, which has been emitted from the laser diode module 63 as a light emitting device and reflected from the half mirror, and the proportion of light led to the first optical fiber 53 is reduced. Further, since the dielectric multi-layer film is provided on one side of the half mirror, a warp disadvantageously occurs in the dielectric multi-layer film filter, leading to lowered performance of the filter.

SUMMARY OF THE INVENTION

Accordingly, it is an object of the invention to provide a wavelength multiplex optical communication module which can realize various functions, such as transmission and reception of signal light of a plurality of wavelengths, in a simple construction.

The above object can be attained by the following features of the invention.

(i) A wavelength multiplex optical communication module comprising: (a) a light emitting device disposed on an optical waveguide substrate; (b) a first optical waveguide for guiding signal light with a first wavelength output from said light emitting device; (c) a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide; (d) a wavelength filter disposed at said other end face of the optical waveguide substrate, for reflecting the signal light with a first wavelength and, in addition, permitting signal light with a second wavelength different from the first wavelength to be transmitted therethrough; (e) a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and (f) an out-of-substrate photodetector that is provided outside the optical waveguide substrate so as to face said other end face of the optical waveguide substrate through the wavelength filter and receives the signal light with a second wavelength which has passed through the wavelength filter.

The above item (i) corresponds to the first, fifth, or sixth preferred embodiment of the invention which will be described later. According to this construction, the signal light with a first wavelength output from a light emitting device is guided through a first optical waveguide, and the power of this light is transferred by the directional coupler to the second optical waveguide, and the light can be led through the second optical waveguide to the outside of the module. The proportion of the power of the signal light with a first wavelength to be transferred to other optical waveguide by the directional coupler may be 100% or around 100%. When the signal light is divided according to applications, design may be done so that a desired transfer proportion can be provided. One end of the second optical waveguide and one end of the third optical waveguide are disposed at one end face of the optical waveguide substrate, while the other end of the second optical waveguide and the other end of the third optical waveguide are disposed so as to face the wavelength filter at the other end face of the optical waveguide substrate. By virtue of this construction, according to the characteristics of the wavelength filter, signal light with a second wavelength may be transmitted through the wavelength filter and received in an out-of-substrate photodetector, or light reflected from the wavelength filter may be optically coupled to the second optical waveguide or the third optical waveguide for leading the reflected light to the outside of the module. In the wavelength multiplex optical communication module according to item (i), when optical fibers are connected to the wavelength multiplex optical communication module, two optical fibers are disposed only on the above-described one end face side of the optical waveguide substrate. Therefore, various components can be arranged on the other side without any trouble, and this can contribute to improved packaging density of various components.

(ii) The wavelength multiplex optical communication module according to the above item (i), wherein signal light with second and third wavelengths is guided, from the one end face side of the second optical waveguide, through the second optical waveguide.

The above item (ii) corresponds to the first preferred embodiment, which will be described later, and specifies the case where, in the wavelength multiplex optical communication module according to the above item (i), signal light with second and third wavelengths is introduced from the above one end face toward the other end face of the second optical waveguide. In this case, a method for using the module can be adopted wherein signal light with a first wavelength is sent from the wavelength multiplex optical communication module to the outside of the module, light with second and third wavelengths is introduced from the outside of the module into the module, and, in the input light with second and third wavelengths, light with a second wavelength is received while light with a third wavelength is again sent to the outside of the module.

(iii) The wavelength multiplex optical communication module according to the above item (i), wherein the wavelength filter reflects signal light with a third wavelength different from the first and second wavelengths, the signal light with a third wavelength is guided through the third optical waveguide toward said other end face, and the signal light with a third wavelength and the signal light with a first wavelength are output from the second optical waveguide and led to the outside of the module.

The above item (iii) corresponds to the second preferred embodiment which will be described later. In this case, a method for using the module can be adopted wherein signal light with a first wavelength is sent from the wavelength multiplex optical communication module to the outside of the module, signal light with a second wavelength is introduced from the second optical waveguide and is received, and signal light with a third wavelength input from the third optical waveguide is again sent from the second optical waveguide to the outside of the module.

(iv) A wavelength multiplex optical communication module comprising: (a) an on-substrate photodetector disposed on an optical waveguide substrate; (b) a second optical waveguide which has a path connecting one end face of the optical waveguide substrate to the other end face of the optical waveguide substrate and guides signal light with first to third wavelengths different from one another; (c) a first optical waveguide that has a portion disposed closely to the waveguide portion in the second optical waveguide to constitute a directional coupler for transferring the power of signal light with a first wavelength at a predetermined ratio to the second optical waveguide and the end of a guide front of the signal light with a first wavelength is optically connected to the on-substrate photodetector; (d) a wavelength filter disposed at said other end face of the optical waveguide substrate, for reflecting the signal light with a first wavelength and, in addition, permitting signal light with a second wavelength different from the first wavelength to be transmitted therethrough; (e) a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and (f) an out-of-substrate photodetector that is provided outside the optical waveguide substrate so as to face said other end face of the optical waveguide substrate through the wavelength filter and receives the signal light with a second wavelength which has passed through the wavelength filter.

The above item (iv) corresponds to the third preferred embodiment of the invention which will be described later. In this wavelength multiplex optical communication module, the following method for using the module can be adopted. Signal light with first to third wavelengths is introduced from the outside of the module into the second optical waveguide. An on-substrate photodetector is disposed on the first optical waveguide. The power of signal light with a first wavelength input into the second optical waveguide is transferred by the directional coupler to the first optical waveguide and is received in the on-substrate photodetector. Signal light with a second wavelength is transmitted through the wavelength filter and is received in the out-of-substrate photodetector. Signal light with a third wavelength is reflected from the wavelength filter, is guided through the third optical waveguide, and is sent to the outside of the module. Also in this wavelength multiplex optical communication module according to the item (iv), when two optical fibers are connected to the wavelength multiplex optical communication module, the two optical fibers are disposed only on the one end face side of the optical waveguide substrate. Therefore, various components can be arranged on the other end face side without any trouble, and, thus, the packaging density of various components can be improved. (v) A wavelength multiplex optical communication module comprising: (a) a light emitting device disposed on an optical waveguide substrate; (b) a first optical waveguide for guiding signal light with a first wavelength output from said light emitting device; (c) a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide; (d) a wavelength filter disposed at said other end face of the optical waveguide substrate, for permitting the signal light with a first wavelength to be transmitted therethrough and, in addition, reflecting signal light with a second wavelength different from the first wavelength; (e) a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and (f) an out-of-substrate photodetector that is provided outside the optical waveguide substrate so as to face said other end face of the optical waveguide substrate through the wavelength filter and receives the signal light with a first wavelength which has passed through the wavelength filter.

The item (v) corresponds to the fourth preferred embodiment which will be described later. In the wavelength multiplex optical communication module according to the item (v) the following method for using the module can be adopted. Signal light with a first wavelength guided through the first optical waveguide is transferred by the directional coupler to the second optical waveguide and is sent through the second optical waveguide to the outside of the module. On the other hand, the signal light with a first wavelength and signal light with a second wavelength are introduced from the outside of the module, and, in these lights, the light with a first wavelength is transmitted through the wavelength filter and is received in the out-of-substrate photodetector, while the signal light with a second wavelength is reflected from the wavelength filter, is coupled to the third optical waveguide, and is sent to the outside of the module. Also in this wavelength multiplex optical communication module according to the item (v), when two optical fibers are connected to the wavelength multiplex optical communication module, the two optical fibers are disposed only on the one end face side of the optical waveguide substrate. Therefore, various components can be arranged on the other end face side without any trouble, and, thus, the packaging density of various components can be improved.

(vi) A wavelength multiplex optical communication module comprising: (a) a light emitting device disposed on an optical waveguide substrate; (b) an on-substrate photodetector disposed on the optical waveguide substrate; (c) a first optical waveguide for guiding signal light with a first wavelength output from said light emitting device; (d) a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide; (e) a wavelength filter disposed at said other end face of the optical waveguide substrate, for reflecting the signal light with a first wavelength and, in addition, permitting signal light with a second wavelength different from the first wavelength to be transmitted therethrough; (f) a third optical waveguide that has a path leading from the on-substrate photodetector to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and (g) an out-of-substrate photodetector that is provided outside the optical waveguide substrate so as to face said other end face of the optical waveguide substrate through the wavelength filter and receives the signal light with a second wavelength which has passed through the wavelength filter.

The item (vi) corresponds to the seventh preferred embodiment of the invention which will be explained later. In the wavelength multiplex optical communication module according to the item (vi), the following method for using the module can be adopted. A light emitting device and an on-substrate photodetector are disposed on the optical waveguide substrate. Signal light with a first wavelength output from the light emitting device is transferred by the directional coupler to the second optical waveguide and is sent through the second optical waveguide to the outside of the module. Signal light with second and third wavelengths is introduced from the outside of the module into the second optical waveguide, and, in the signal light with second and third wavelengths, signal light with a second wavelength is transmitted through the wavelength filter and is received in the out-of-substrate photodetector, while signal light with a third wavelength is reflected from the wavelength filter, is coupled to the third optical waveguide, and is received in the on-substrate photodetector. In this wavelength multiplex optical communication module according to the item (vi), when an optical fiber is connected to the wavelength multiplex optical communication module, one optical fiber is disposed on the one end face side of the optical waveguide substrate. Therefore, various components can be arranged on the other end face side without any trouble, and, thus, the packaging density of various components can be improved.

(vii) The wavelength multiplex optical communication module according to any one of the above items (i) to (vi), wherein a monitoring photodetector for receiving light output from the light emitting device is disposed on the optical waveguide substrate in its position behind the light emitting device provided on the optical waveguide substrate.

The item (vii) corresponds to the fifth preferred embodiment of the invention which will be explained later. In this wavelength multiplex optical communication module according to the item (vii), not only a light emitting device but also a photodetector for monitoring is disposed on the optical waveguide substrate. By virtue of this construction, the power of light output from the light emitting device can be stabilized, and, at the same time, the number of components disposed outside of the optical waveguide substrate can be reduced.

(viii) The wavelength multiplex optical communication module according to any one of the above items (i) to (vi), wherein a monitoring photodetector for receiving light output from the light emitting device is disposed, so as to face the light emitting device disposed on the optical waveguide substrate, in a region on the outside of the optical waveguide substrate wherein the wavelength filter is not interposed between the light emitting device and the monitoring photodetector.

The item (viii) corresponds to the sixth preferred embodiment of the invention which will be explained later. This wavelength multiplex optical communication module according to the item (viii) is different from the wavelength multiplex optical communication module according to the item (vii) in that the photodetector for monitoring is disposed in a region on the outside of the optical waveguide substrate to stabilize the power of light output from the light emitting device.

(ix) The wavelength multiplex optical communication module according to the above item (i), (iii), (iv), (v), (vi), or (viii), wherein the wavelength filter is applied to the end face of the optical waveguide substrate.

In the wavelength multiplex optical communication module according to the item (ix), the wavelength filter is applied to the end face of the optical waveguide substrate. According to this construction, various wavelength multiplex optical communication modules can be simply prepared by selectively using various wavelength filters, and, thus, parts and packages can be shared.

BRIEF DESCRIPTION OF THE DRAWINGS

The invention will be explained in more detail in conjunction with the appended drawings, wherein.

DESCRIPTION OF THE PREFERRED EMBODIMENTS

Figure 5:
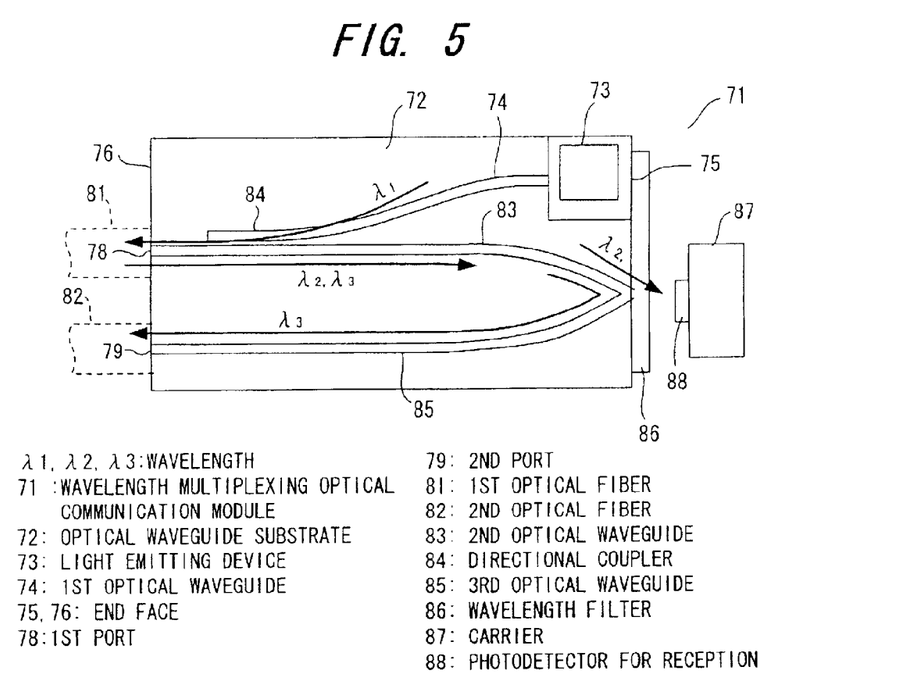
FIG. 5 is a plan view showing the construction of a wavelength multiplex optical communication module in a first preferred embodiment of the invention.

Preferred embodiments of the invention will be explained in detail in conjunction with the accompanying drawings.
First Preferred Embodiment FIG. 5 shows the construction of the wavelength multiplex optical communication module in the first preferred embodiment of the invention. In this wavelength multiplex optical communication module 71, a light emitting device 73 formed of a laser diode or the like is disposed at the upper right corner portion of the upper surface of the optical waveguide substrate 72 in the drawing. One end of a first optical waveguide 74 is optically coupled to the output side of this light emitting device 73. The other end of the first optical waveguide 74 extends toward the end face 76 disposed at a position opposite to the end face 75 of the optical waveguide substrate 72, in which the light emitting device 73 is disposed. The other end of the first optical waveguide 74, however, does not reach and ends at a position before the end face 76. The end of the first optical fiber 81 and the end of the second optical fiber 82 are optically coupled respectively to first and second ports 78, 79 disposed at the end face 76.

One end of the second optical waveguide 83 optically connected to the first optical fiber 81 is connected to the first port 78. The other end of the second optical waveguide 83 is disposed at the end face 75, and a portion between both ends of the second optical waveguide 83 is disposed closely to the end of the first optical waveguide 74. In the portion where the first optical waveguide 74 and the second optical waveguide 83 are close to each other, a directional coupler 84 having a multiplexing/demultiplexing function is formed. One end of the third optical waveguide 85 is optically coupled to the second port 79 in the end face 76, and the other end of the third optical waveguide 85 is optically coupled to the other end of the second optical waveguide 83 at the end face 75.

A wavelength filter 86 for wavelength selection is applied to the end face 75. A photodetector 88 for reception, such as a photodiode, mounted on a carrier 87 is disposed near the wavelength filter 86 in such a manner that the photodetector 88 for reception faces the filter face. The photodetector 88 for reception is constructed so as to selectively receive light introduced from the first optical fiber 81 and guided through the second optical waveguide 83.

Figure 6:
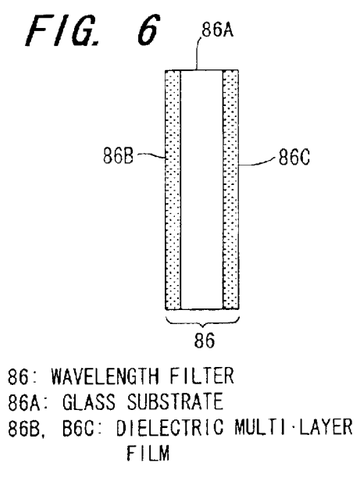
FIG. 6 is a cross-sectional view of a wavelength filter in the first preferred embodiment of the invention.

FIG. 6 shows the sectional structure of the wavelength filter in this preferred embodiment. The wavelength filter 86 comprises: a glass substrate 86A; a dielectric multi-layer film 86B provided on one side (the end face 75 side of the optical waveguide substrate) of the glass substrate 86A, for cutting off light with wavelength $\lambda 3$; and a dielectric multi-layer film 86C provided on the other side of the glass substrate 86A, for cutting off light with wavelength $\lambda 1$. Since the dielectric multi-layer films 86B, 86C are provided respectively on both sides of the glass substrate 86A, there is no fear of causing a warp in the filter per se.

Figure 7:
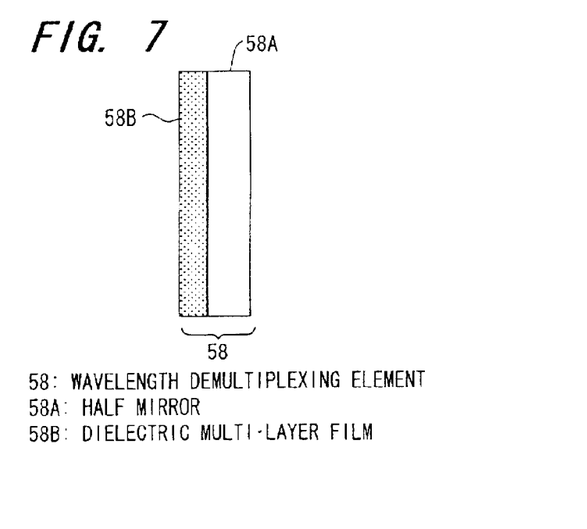
FIG. 7 is a cross-sectional view of the conventional wavelength demultiplexing element shown in FIG. 4, for comparison with the invention.

FIG. 7 shows a conventional wavelength demultiplexing element shown in FIG. 4 for comparison with the invention. The wavelength demultiplexing element 58 has a structure such that a dielectric multi-layer film 58B for completely cutting off light with wavelength $\lambda 1$ and permitting light with wavelength $\lambda 2$ to be transmitted therethrough is provided on one side of a half mirror 58A which cuts off a part of light with wavelength $\lambda 2$. Therefore, as described above, when light with wavelength $\lambda 2$ is incident from the light emitting device side, the loss of folding-back light is increased and, in addition, a warp occurs due to the provision of the dielectric multi-layer film 58B on one side of the half mirror 58A.

Figure 8:
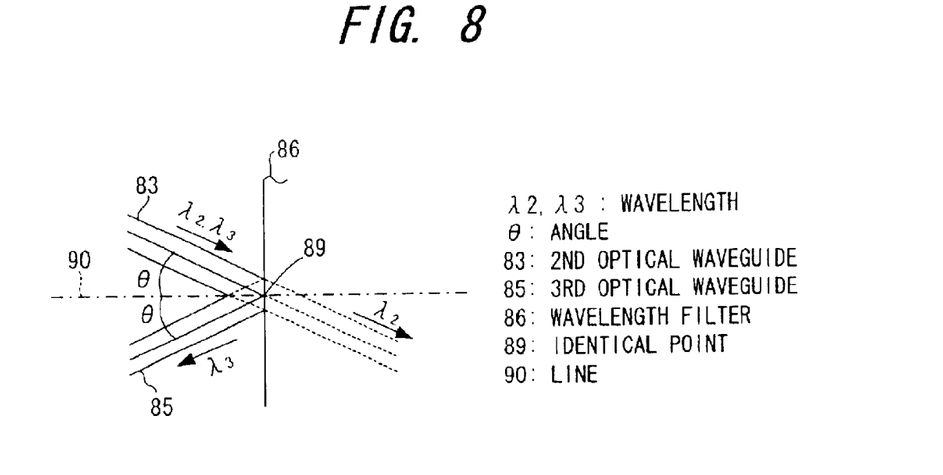
FIG. 8 is an enlarged explanatory view of a connection between the wavelength filter in the first preferred embodiment of the invention and the second and third optical waveguides in the first preferred embodiment of the invention.

FIG. 8 shows an enlarged view of a connection between the wavelength filter and the second and third optical waveguides. The second optical waveguide 83 and the third optical waveguide 85 are arranged so that the center axis of the second optical waveguide 83 and the center axis of the third optical waveguide 85 come into contact with the surface of the dielectric multi-layer film 86B (see FIG. 6) at an identical point 89 and, at the same time, make an equal angle θ with a line 90 extended from this point 89 perpendicularly to the dielectric multi-layer film 86B. This construction permits light with wavelength λ3, incident from the second optical waveguide on the wavelength filter 86, to be reflected from this face and to travel through the third optical waveguide 85. Light with wavelength λ2 is transmitted through the wavelength filter 86.

In the wavelength multiplex optical communication module 71 having this construction, the light emitting device 73 outputs light with wavelength λ1. This light with wavelength λ1 is guided through the first optical waveguide 74 and reaches the directional coupler 84. The directional coupler 84 is designed so that the power of light with wavelength λ1 guided through the first optical waveguide 74 is transferred to the second optical waveguide 83 and is led to the transmission line thereof. The first optical fiber 81 introduces light with wavelengths λ2 and λ3, which are different from wavelength λ1 and, at the same time, are different from each other, into the first port 78. Therefore, light with wavelengths λ2 and λ3 is guided through the first optical waveguide 74 in a direction opposite to the direction in which light with wavelength λ1 is guided through the first optical waveguide 74. The directional coupler 84, however, is designed so that the light with wavelengths λ2 and λ3, which has been guided through the second optical waveguide 83, as such is guided through the second optical waveguide 83.

The light with wavelengths λ2 and λ3 guided through the second optical waveguide 83 reaches the wavelength filter 86. The wavelength filter 86 is provided with a dielectric multi-layer film which has wavelength characteristics such that dielectric multi-layer film reflects light with wavelength λ1 and light with wavelength λ3 and permits the transmission of light with wavelength λ2 therethrough. Therefore, in the light with wavelengths λ2 and λ3 which has been traveled through the second optical waveguide 83, light with wavelength λ3 is reflected from the wavelength filter 86. The reflected light with wavelength λ3 is coupled to the third optical waveguide 85. Therefore, the light with wavelength λ3 is guided through the third optical waveguide 85 and is incident on the second optical fiber 82. On the other hand, light with wavelength λ2 is transmitted through the wavelength filter 86 and is incident on the photodetector 88 for reception disposed behind the wavelength filter 86.

For example, when the light emitting device 73 outputs a transmission signal light with a 1.3 μm band as the wavelength λ1, this transmission signal light with wavelength λ1 is coupled to the first optical waveguide 74. The power of light is transferred to the second optical waveguide 83 by the directional coupler 84, and the transmission signal light with wavelength λ1 is led to the first optical fiber 81. In the light with wavelengths λ2 and λ3 which has been introduced through the first optical fiber 81 and coupled to the second optical waveguide 83, light with wavelength λ2 is, for example, a signal light with a 1.5 μm band, and light with wavelength λ3 is a signal light with a 1.55 μm band. For example, a method may be adopted wherein the 1.3 μm band of the wavelength λ1 is used as a leading signal, the 1.5 μm band of the wavelength λ2 is used as a trailing signal, and the 1.55 μm band of the wavelength λ3 is used as a signal for a system used in other application such as video signals.

The light with wavelengths λ2 and λ3 introduced through the first optical fiber 81 and coupled to the second optical waveguide 83 is guided through the directional coupler 84 and as such is led to the second optical waveguide 83. In the light with wavelengths λ2 and λ3, signal light with wavelength λ2 is passed through the wavelength filter 86 and is received in the photodetector 88 for reception. The other signal light, such as a video signal, with wavelength λ3 is reflected from the wavelength filter 86. The reflected light is coupled to the third optical waveguide 85 and is led to the second optical fiber 82 to lead the light to the outside of the module.

The wavelength filter 86 reflects not only the signal light with wavelength λ3 but also the transmission signal light with wavelength λ1. For this reason, even when leaked light of the light with wavelength λ1 emitted from the light emitting device 73 is incident toward the wavelength filter 86, there is no fear of the leaked light being transmitted through the wavelength filter 86 and received in the photodetector 88 for reception.

Thus, in the wavelength multiplex optical communication module 71 in this preferred embodiment, a function can be realized wherein transmission signal light with wavelength λ1 is sent to the outside of the module, signal light with wavelength λ2 is received from the outside of the module, and, in addition, signal light with wavelength λ3 as such is led to the outside of the module. That is, the wavelength multiplex optical communication module 71 sends signal light with a 1.3 μm band, receives signal light with a 1.5 μm band, and, in addition, functions to separate the signal light with a 1.55 μm band and to lead this signal light to the outside of the module. Therefore, as compared with the case where the same function is realized using an expensive external WDM (wavelength division multiplex) transmission system, the function necessary for the communication system can be realized at very low cost.

Second Preferred Embodiment

Figure 9:
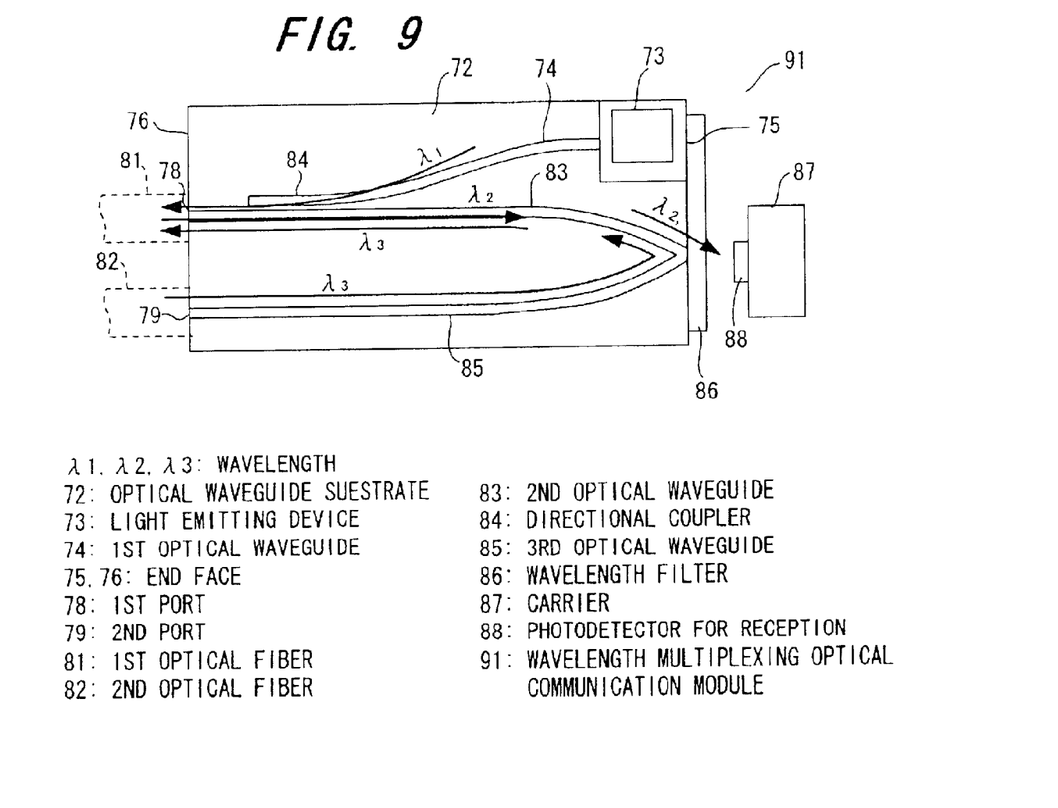
FIG. 9 is a plan view showing the construction of a wavelength multiplex optical communication module in a second preferred embodiment of the invention.

FIG. 9 shows the construction of the wavelength multiplex optical communication module in the second preferred embodiment of the invention. In this wavelength multiplex optical communication module 91 in the second preferred embodiment shown in FIG. 9 and the wavelength multiplex optical communication module 71 in the first preferred embodiment shown in FIG. 5, like parts are identified with the same reference numerals, and the overlapped explanation thereof will be omitted. In the wavelength multiplex optical communication module 91 in this preferred embodiment, the structure of each section constituting the module is substantially the same as that in the first preferred embodiment, except that signal light with wavelength λ2 is input into the first port 78 through the first optical fiber 81, and signal light with wavelength λ3 is input into the second port 79 through the second optical fiber 82.

Also in this wavelength multiplex optical communication module 91 in the second preferred embodiment, the light emitting device 73 outputs light with wavelength λ1. This light with wavelength λ1 is guided through the first optical waveguide 74 and is led from the first port 78 to the first optical fiber 81 by the directional coupler 84.

On the other hand, signal light with wavelength λ2 incident through the first optical fiber 81 on the first port 78 is guided through the second optical waveguide 83, reaches the wavelength filter 86, is transmitted through the wavelength filter 86, and is received in the photodetector 88 for reception. The signal light with wavelength λ3 incident from the second optical fiber 82 on the second port 79 is reflected by the wavelength filter 86, is coupled to the second optical waveguide 83, and is led through the first port 78 to the first optical fiber 81. Also in this second preferred embodiment, by virtue of the provision of the wavelength filter 86, even when light with wavelength $\lambda 1$ leaked from the light emitting device 73 reaches the wavelength filter 86, the leaked light is not transmitted through the wavelength filter 86. Therefore, the entry of the light with wavelength $\lambda 1$ into the photodetector 88 for reception can be prevented.

Third Preferred Embodiment

Figure 10:
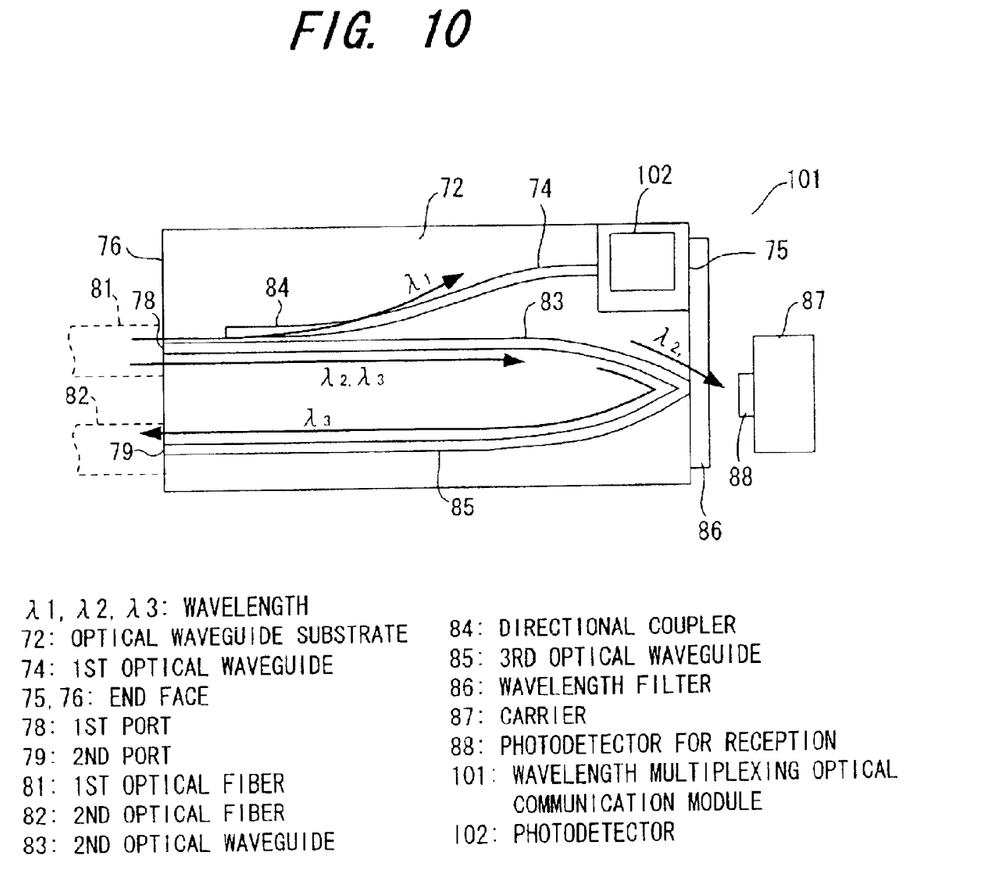
FIG. 10 is a plan view showing the construction of a wavelength multiplex optical communication module in a third preferred embodiment of the invention.

FIG. 10 shows the construction of the wavelength multiplex optical communication module in the third preferred embodiment of the invention. In FIGS. 10 and 5, like parts are identified with the same reference numerals, and the overlapped explanation thereof will be omitted. In the wavelength multiplex optical communication module 101 in the third preferred embodiment, a photodetector 102, such as a photodiode, is disposed instead of the light emitting device 73 in the first and second preferred embodiments at the same position where the light emitting device 73 has been disposed in the first and second preferred embodiments.

Signal light with three different wavelengths $\lambda 1$, $\lambda 2$, and $\lambda 3$ as explained in the above preferred embodiments is input through a first optical fiber 81 into a first port 78. In the signal light with wavelengths $\lambda 1$, $\lambda 2$, and $\lambda 3$, the power of signal light with wavelength $\lambda 1$ is transferred to a first optical waveguide 74 by a directional coupler 84, and is received in the photodetector 102. The signal light with the remaining wavelengths $\lambda 2$ and $\lambda 3$ is guided through a second optical waveguide 83, and reaches a wavelength filter 86. The wavelength filter 86 is provided with a dielectric multi-layer film having wavelength characteristics such that light with wavelength $\lambda 1$ and light with wavelength $\lambda 3$ are reflected while light with wavelength $\lambda 2$ is transmitted therethrough. Therefore, signal light with wavelength $\lambda 2$ is transmitted through the wavelength filter 86 and is detected by a photodetector 88 for reception.

On the other hand, signal light with wavelength $\lambda 3$ is reflected from the wavelength filter 86. Therefore, the signal light with wavelength $\lambda 3$ is coupled to a third optical waveguide 85, and is led to a second optical fiber 82.

Fourth Preferred Embodiment

Figure 11:
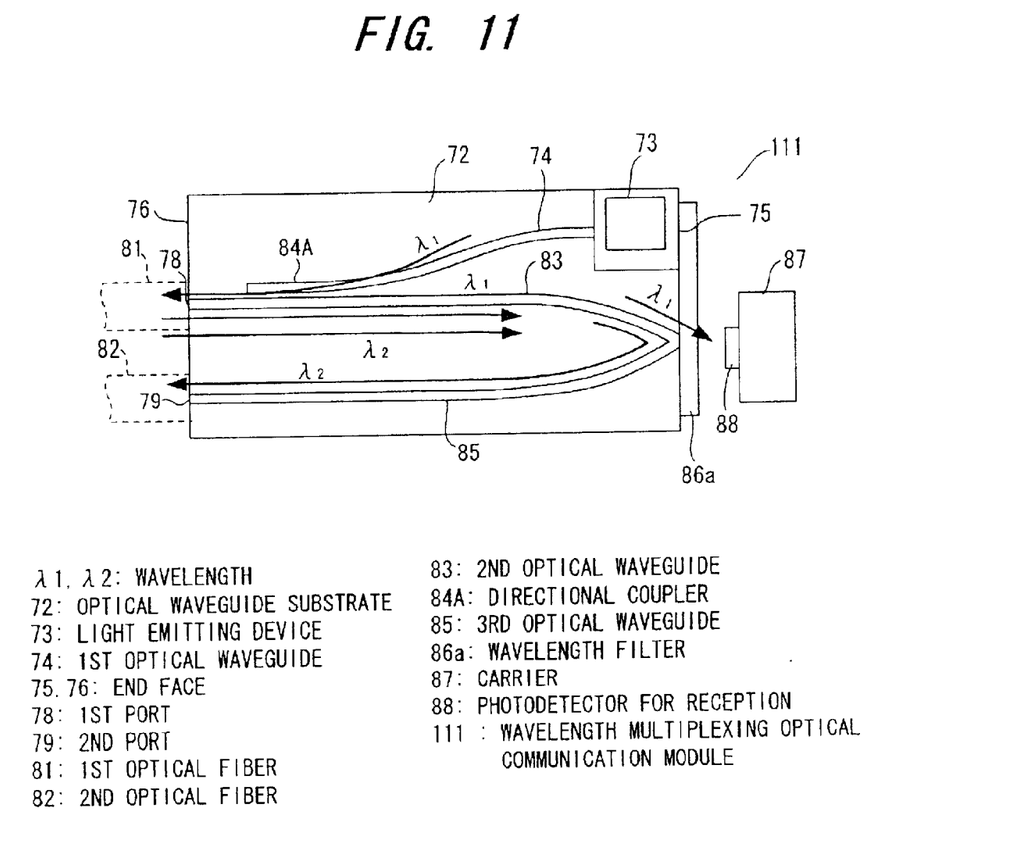
FIG. 11 is a plan view showing the construction of a wavelength multiplex optical communication module according to a fourth preferred embodiment of the invention.

FIG. 11 shows the construction of the wavelength multiplex optical communication module in the fourth preferred embodiment of the invention. In FIGS. 11 and 5, like parts are identified with the same reference numerals, and the overlapped explanation thereof will be omitted. The construction of this wavelength multiplex optical communication module 111 in the fourth preferred embodiment is substantially the same as that of the wavelength multiplex optical communication module 71 in the first preferred embodiment, except that the design of the directional coupler 84 and the wavelength filter 86 in the first preferred embodiment has been changed. Specifically, a directional coupler 84A in the fourth preferred embodiment is designed so that the half of the power of signal light with wavelength $\lambda 1$ is transferred from the first optical waveguide 74 to the second optical waveguide 83 or vice versa. Further, a wavelength filter 86a is provided with a dielectric multi-layer film having wavelength characteristics such that light with wavelength $\lambda 2$ is reflected while light with wavelength $\lambda 1$ is transmitted therethrough. This wavelength filter 86a is also applied to the end face 75.

In this wavelength multiplex optical communication module 111 in the fourth preferred embodiment, transmission signal light with wavelength $\lambda 1$ output from a light emitting device 73 is coupled to a first optical waveguide 74, and the half of the power of the light with wavelength $\lambda 1$ is transferred to the second optical waveguide 83 by a directional coupler 84A, thereby permitting the light with wavelength $\lambda 1$ to be led to a first optical fiber 81. Signal light with wavelengths $\lambda 1$ and $\lambda 2$ is input through the first optical fiber 81 into the first port 78. Signal light with wavelength $\lambda 2$ is guided through the directional coupler 84A and as such is led to the second optical waveguide 83. Thereafter, the signal light with wavelength $\lambda 2$ is reflected from the wavelength filter 86a, is coupled to the third optical waveguide 85, and is led to the second optical fiber 82. On the other hand, the half of the power of signal light with wavelength $\lambda 1$ is transferred to the first optical waveguide 74 by the directional coupler 84A, and the remainder of the signal light with wavelength $\lambda 1$ is led to the second optical waveguide 83. This signal light with wavelength $\lambda 1$ is transmitted through the wavelength filter 86a and is received in a photodetector 88 for reception.

Thus, in the wavelength multiplex optical communication module 111 in the fourth preferred embodiment, a module is realized which has the function of sending/receiving transmission signal light with wavelength $\lambda 1$ while signal light with wavelength $\lambda 2$ as such is led to the outside of the module. In this preferred embodiment, the branching ratio in the directional coupler 84A has been set to 1:1. This ratio, however, can be freely set to other ratios. Varying the branching ratio can realize the optimization of the power ratio of the transmission light to the reception light.

Fifth Preferred Embodiment

Figure 12:
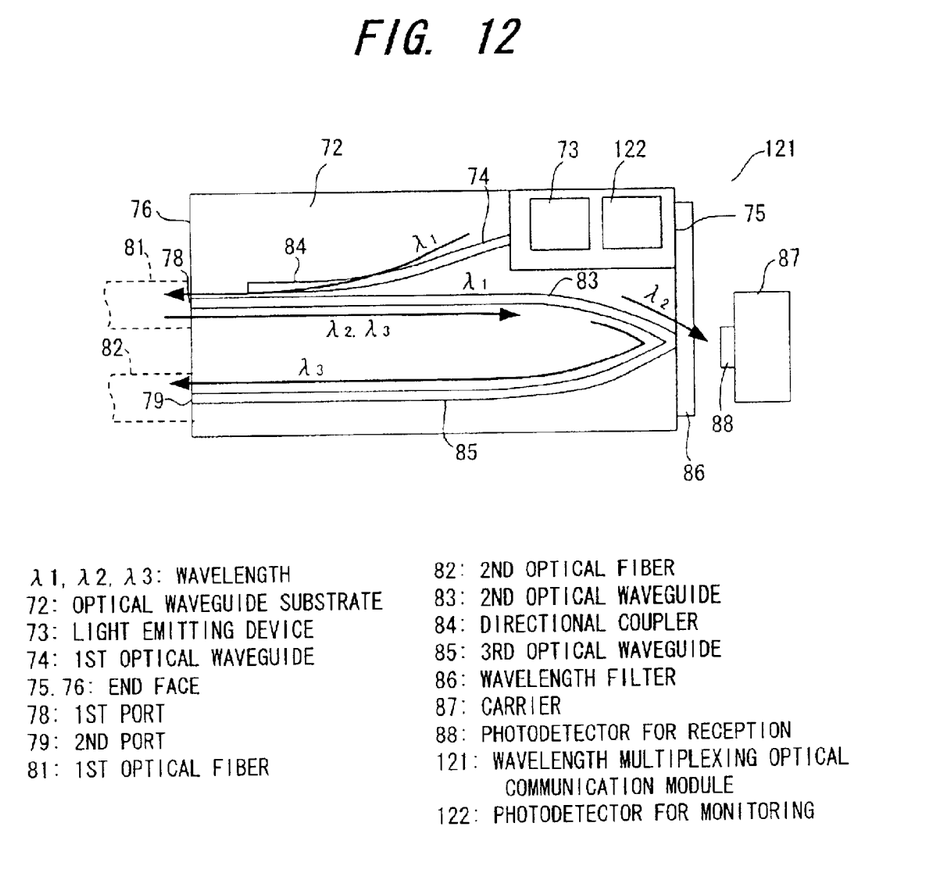
FIG. 12 is a plan view showing the construction of a wavelength multiplex optical communication module in a fifth preferred embodiment of the invention.

FIG. 12 shows the construction of the wavelength multiplex optical communication module in the fifth preferred embodiment of the invention. In FIGS. 12 and 5, like parts are identified with the same reference numerals, and the overlapped explanation thereof will be omitted. The wavelength multiplex optical communication module 121 in the fifth preferred embodiment has a structure such that a photodetector 122 for monitoring, such as a photodiode, is provided behind a light emitting device 73. The photodetector 122 for monitoring receives light, which has been output backward from the light emitting device 73, to monitor the output of the transmission signal light. Therefore, the power of the transmission signal light with wavelength $\lambda 1$ can be stably controlled by monitoring the photodetector 122.

Also in the wavelength multiplex optical communication module 91 shown in FIG. 9 in the second preferred embodiment and the wavelength multiplex optical communication module 111 shown in FIG. 11 in the fourth preferred embodiment, the provision of the photodetector 122 for monitoring can provide the same effect.

Sixth Preferred Embodiment

Figure 13:
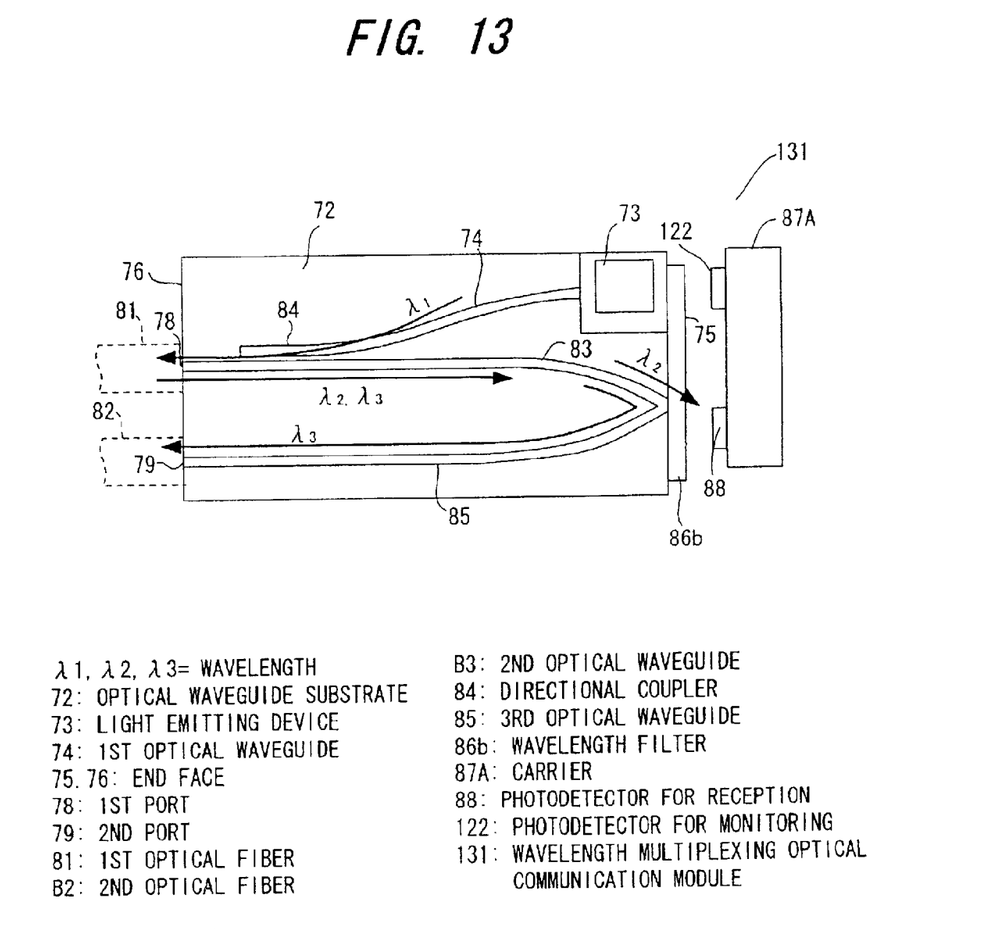
FIG. 13 is a plan view showing the construction of a wavelength multiplex optical communication module in a sixth preferred embodiment of the invention.

FIG. 13 shows the construction of the wavelength multiplex optical communication module in the sixth preferred embodiment of the invention. In FIGS. 13, 5, and 12, like parts are identified with the same reference numerals, and the overlapped explanation thereof will be omitted. In this wavelength multiplex optical communication module 131 in the sixth preferred embodiment, a photodetector 88 for reception and a photodetector 122 for monitoring are disposed on a carrier 87A in such a manner that the photodetector 88 for reception and the photodetector 122 for monitoring each face the end face 75 of the optical waveguide substrate 72. In the sixth preferred embodiment, however, a wavelength filter 86b is applied to the end face 75 so as to avoid a predetermined region in the rear of the photodetector 88 for reception. Therefore, according to this construction, the wavelength filter 86b for wavelength selection is interposed between the photodetector 88 for reception and the end face 75 in its portion which faces the photodetector 88 for reception, whereas this wavelength filter 86b is absent between the photodetector 122 for monitoring and the end face 75 in its portion which faces the photodetector 122 for monitoring. The wavelength filter 86b is the same as the wavelength filter 86 in the first preferred embodiment, except that the size per se is different. Therefore, the wavelength filter 86b is identical to the wavelength filter 86 in characteristics for wavelengths.

By virtue of this layout, in the wavelength multiplex optical communication module 131 in the sixth preferred embodiment, light output backward from a light emitting device 73 provided on an optical waveguide substrate 72 is received in the photodetector 122 for monitoring without being cut off by the wavelength filter 86b. The power of transmission signal light with wavelength λ1 output from the light emitting device 73 monitored and controlled by the photodetector 122 for monitoring is transferred to the second optical waveguide 83, and, consequently, the light with wavelength λ1 is led to a first optical fiber 81.

On the other hand, signal light with wavelengths λ2 and λ3 incident through the first optical fiber 81 on the first port 78 reaches the wavelength filter 86b, and only signal light with wavelength λ2 is transmitted through the wavelength filter 86b and is received in the photodetector 88 for reception. Signal light with wavelength λ3 is reflected from the wavelength filter 86b. The reflected light is coupled to a third optical waveguide 85 and is led to a second optical fiber 82 to lead this light with wavelength λ3 to the outside of the module. This can realize the control of the output of the light emitting device 73 without the necessity of increasing the number of components provided on the optical waveguide substrate 72.

Seventh Preferred Embodiment

Figure 14:
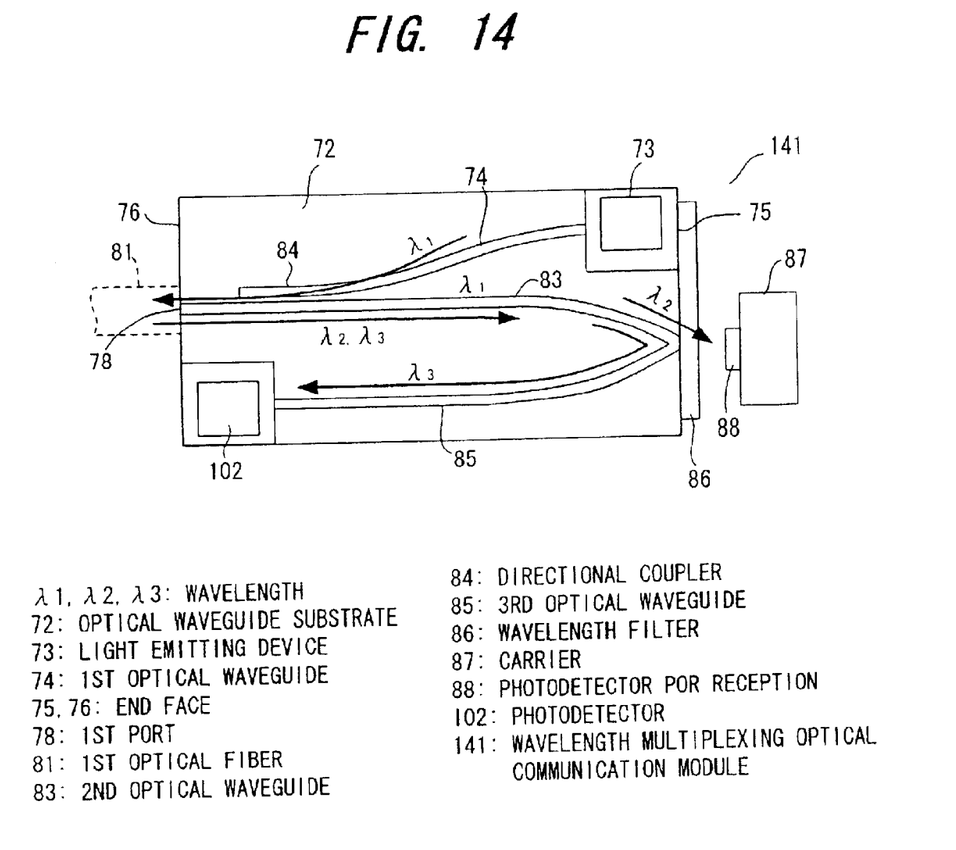
FIG. 14 is a plan view showing the construction of a wavelength multiplex optical communication module in a seventh preferred embodiment of the invention.

FIG. 14 shows the construction of the wavelength multiplex optical communication module in the seventh preferred embodiment of the invention. In FIGS. 14, 5, and 10, like parts are identified with the same reference numerals, and the overlapped explanation thereof will be omitted. In this wavelength multiplex optical communication module 141 in the seventh preferred embodiment, a photodetector 102 is provided on an optical waveguide substrate 72 in such a manner that a light emitting device 73 is located at one end of a diagonal line on the optical waveguide substrate 72 while the photodetector 102 is located at the other end of the diagonal line. One end of a third optical waveguide 85 is connected to a wavelength filter 86, and the other end of the third optical waveguide 85 is connected to the photodetector 102. In this wavelength multiplex optical communication module 141, only a first optical fiber 81 is connected to the optical waveguide substrate 72, and the second optical fiber 82 shown, for example, in FIG. 5 is not connected to the optical waveguide substrate 72.

This wavelength multiplex optical communication module 141 in the seventh preferred embodiment sends transmission signal light with wavelength λ1 through a first optical fiber 81 to the outside of the module, receives, in a photodetector 88 for reception, signal light with wavelength λ2 received from the first optical fiber 81, and receives, in a photodetector 102, signal light with wavelength λ3 which is likewise received from the first optical fiber 81.

In the preferred embodiments, the wavelength filter has been applied to the end face of the optical waveguide substrate. Alternatively, a method may be adopted wherein wavelength filters having various wavelength characteristics are provided and are selectively applied. According to this method, various wavelength multiplex optical communication modules can be simply prepared, and, thus, parts and packages can be shared. The same effect can also be attained by changing the optical element mounted on the optical waveguide substrate.

In the wavelength multiplex optical communication modules in the above preferred embodiments, one of or both the first optical fiber 81 and the second optical fiber 82 has been mounted on the optical waveguide substrate 72. However, it is a matter of course that these optical fibers may be omitted to constitute a wavelength multiplex optical communication module.

As is apparent from the foregoing description, in the wavelength multiplex optical communication modules of the invention referred to in the above items (i) to (ix), the input/output of signal light can be carried out from only one end face side of the optical waveguide substrate, and, thus, high density packaging of module can be realized. Specifically, in the wavelength multiplex optical communication modules according to the above items (i) to (v), (vii), and (viii), two optical fibers are disposed on one side of the module. Therefore, in packaging the module in a wiring board, there is no need to provide a space, for preventing the fiber from coming into contact with other electrical components, on both sides of the module. This can realize high density packaging on the wiring board. In particular, in the wavelength multiplex optical communication module according to the above item (vi), what is needed is to mount only one optical fiber on one side of the module, and, thus, the packaging density can be further improved.

In the wavelength multiplex optical communication modules according to the above items (i) to (ix), a combination of a directional coupler with a wavelength filter is used to constitute the wavelength multiplex optical communication modules. This can render the structure of the whole module compact. Unlike the prior art technique, the branching or the transmission/reception of two or three wavelengths can be realized by a simple structure. Further, the invention can eliminate the need to insert a wavelength filter into a groove provided in an optical waveguide substrate, and, in the invention, what is required is only to mount a wavelength filter, for example, by applying the wavelength filter to the end face of the substrate. This can facilitate the assembly work of the module, and thus can realize the automation of assembly and mass production of modules.

In the wavelength multiplex optical communication modules according to the above items (i) to (v) and (vii) to (ix), a function for branching the third wavelength and leading the third wavelength to the outside of the module is built in the module. This can eliminate the need to use expensive external WDM. Therefore, as compared with the conventional wavelength multiplex optical communication module using external WDM and transmission/reception module in combination therewith, modules can be realized at much lower cost.

In the wavelength multiplex optical communication module according to the above item (ix), the application of the wavelength filter to the end face of the optical waveguide substrate enables various wavelength multiplex optical communication modules to be simply prepared by selectively using various wavelength filters, and, thus, can realize sharing of parts and packages.

Further, in the wavelength multiplex optical communication modules according to the above items (i) to (iii) or the above items (v) to (ix), light output from the light emitting device can be led, for example, to the optical fiber explained in the above preferred embodiment without passage through a folding back portion by the filter. This can reduce transmission signal light loss and can realize high output power of the module.

The invention has been described in detail with particular reference to preferred embodiments, but it will be understood that variations and modifications can be effected within the scope of the invention as set forth in the appended claims.

What is claimed is:

1. A wavelength multiplex optical communication module comprising:

a light emitting device disposed on an optical waveguide substrate;

a first optical waveguide for guiding signal light with a first wavelength output from said light emitting device;

a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide;

a wavelength filter disposed at said other end face of the optical waveguide substrate, for reflecting the signal light with a first wavelength and, in addition, permitting signal light with a second wavelength different from the first wavelength to be transmitted therethrough;

a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and an out-of-substrate photodetector that is provided outside the optical waveguide substrate so as to face said other end face of the optical waveguide substrate through the wavelength filter and receives the signal light with a second wavelength which has passed through the wavelength filter.

2. The wavelength multiplex optical communication module according to claim 1, wherein signal light with second and third wavelengths is guided from said one end face side of the second optical waveguide through the second optical waveguide.

3. The wavelength multiplex optical communication module according to claim 1, wherein the wavelength filter reflects signal light with a third wavelength different from the first and second wavelengths, the signal light with a third wavelength is guided through the third optical waveguide toward said other end face, and the signal light with a third wavelength and the signal light with a first wavelength are output from the second optical waveguide and led to the outside of the module.

4. The wavelength multiplex optical communication module according to claim 3, wherein the wavelength filter is applied to the end face of the optical waveguide substrate.

5. The wavelength multiplex optical communication module according to claim 1, wherein a monitoring photodetector for receiving light output from the light emitting device is disposed on the optical waveguide substrate in its position behind the light emitting device provided on the optical waveguide substrate.

6. The wavelength multiplex optical communication module according to claim 1, wherein a monitoring photodetector for receiving light output from the light emitting device is disposed, so as to face the light emitting device disposed on the optical waveguide substrate, in a region on the outside of the optical waveguide substrate wherein the wavelength filter is not interposed between the light emitting device and the monitoring photodetector.

7. The wavelength multiplex optical communication module according to claim 1, wherein the wavelength filter is applied to the end face of the optical waveguide substrate.

8. A wavelength multiplex optical communication module comprising:

an on-substrate photodetector disposed on an optical waveguide substrate;

a second optical waveguide which has a path connecting one end face of the optical waveguide substrate to the other end face of the optical waveguide substrate and guides signal light with first to third wavelengths different from one another;

a first optical waveguide that has a portion disposed closely to the waveguide portion in the second optical waveguide to constitute a directional coupler for transferring the power of signal light with a first wavelength at a predetermined ratio to the second optical waveguide and the end of a guide front of the signal light with a first wavelength is optically connected to the on-substrate photodetector;

a wavelength filter disposed at said other end face of the optical waveguide substrate, for reflecting the signal light with a first wavelength and, in addition, permitting signal light with a second wavelength different from the first wavelength to be transmitted therethrough;

a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and an out-of-substrate photodetector that is provided outside the optical waveguide substrate so as to face said other end face of the optical waveguide substrate through the wavelength filter and receives the signal light with a second wavelength which has passed through the wavelength filter.

9. The wavelength multiplex optical communication module according to claim 8, wherein the wavelength filter is applied to the end face of the optical waveguide substrate.

10. A wavelength multiplex optical communication module comprising:

a light emitting device disposed on an optical waveguide substrate;

a first optical waveguide for guiding signal light with a first wavelength output from said light emitting device;

a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide;

a wavelength filter disposed at said other end face of the optical waveguide substrate, for permitting the signal light with a first wavelength to be transmitted therethrough and, in addition, reflecting signal light with a second wavelength different from the first wavelength;

a third optical waveguide that has a path connecting one end face of the optical waveguide substrate to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and an out-of-substrate photodetector that is provided outside the optical waveguide substrate so as to face said other end face of the optical waveguide substrate through the wavelength filter and receives the signal light with a first wavelength which has passed through the wavelength filter.

11. The wavelength multiplex optical communication module according to claim 10, wherein a monitoring photodetector for receiving light output from the light emitting device is disposed on the optical waveguide substrate in its position behind the light emitting device provided on the optical waveguide substrate.

12. The wavelength multiplex optical communication module according to claim 10, wherein a monitoring photodetector for receiving light output from the light emitting device is disposed, so as to face the light emitting device disposed on the optical waveguide substrate, in a region on the outside of the optical waveguide substrate wherein the wavelength filter is not interposed between the light emitting device and the monitoring photodetector.

13. The wavelength multiplex optical communication module according to claim 12, wherein the wavelength filter is applied to the end face of the optical waveguide substrate.

14. The wavelength multiplex optical communication module according to claim 10, wherein the wavelength filter is applied to the end face of the optical waveguide substrate.

15. A wavelength multiplex optical communication module comprising:

a light emitting device disposed on an optical waveguide substrate;

an on-substrate photodetector disposed on the optical waveguide substrate;

a first optical waveguide for guiding signal light with a first wavelength output from said light emitting device;

a second optical waveguide that has a path connecting one end face of the optical waveguide substrate to the other end face of the optical waveguide substrate and has a portion of the waveguide, between both ends of the path, which is disposed closely to the first optical waveguide to constitute a directional coupler for transferring the power of the signal light with a first wavelength at a predetermined ratio to the second optical waveguide;

a wavelength filter disposed at said other end face of the optical waveguide substrate, for reflecting the signal light with a first wavelength and, in addition, permitting signal light with a second wavelength different from the first wavelength to be transmitted therethrough;

a third optical waveguide that has a path leading from the on-substrate photodetector to the other end face of the optical waveguide substrate and is disposed in such a manner that the end of the third optical waveguide and the end of the second optical waveguide face the wavelength filter on said other end face side of the optical waveguide substrate so that, according to reflecting characteristics of the wavelength filter with respect to a predetermined wavelength, a reflected light, which has been guided through the second optical waveguide and reflected from the wavelength filter, is coupled to the third optical waveguide while a reflected light, which has been guided through the third optical waveguide and reflected from the wavelength filter, is coupled to the second optical waveguide; and an out-of-substrate photodetector that is provided outside the optical waveguide substrate so as to face said other end face of the optical waveguide substrate through the wavelength filter and receives the signal light with a second wavelength which has passed through the wavelength filter.

16. The wavelength multiplex optical communication module according to claim 15, wherein a monitoring photodetector for receiving light output from the light emitting device is disposed on the optical waveguide substrate in its position behind the light emitting device provided on the optical waveguide substrate.

17. The wavelength multiplex optical communication module according to claim 15, wherein a monitoring photodetector for receiving light output from the light emitting device is disposed, so as to face the light emitting device disposed on the optical waveguide substrate, in a region on the outside of the optical waveguide substrate wherein the wavelength filter is not interposed between the light emitting device and the monitoring photodetector.

18. The wavelength multiplex optical communication module according to claim 15, wherein the wavelength filter is applied to the end face of the optical waveguide substrate.

* * * * *